US005567528A

United States Patent [19]
Toerner et al.

[11] Patent Number: 5,567,528
[45] Date of Patent: Oct. 22, 1996

[54] POLYMER CONCRETE COATING FOR PIPE, TUBULAR SHAPES, OTHER METAL MEMBERS AND METAL STRUCTURES

[75] Inventors: Thomas J. Toerner, The Woodlands; Bang T. Tran, Sugarland, both of Tex.

[73] Assignee: Power Lone Star, Inc., Houston, Tex.

[21] Appl. No.: 470,266

[22] Filed: Jun. 6, 1995

Related U.S. Application Data

[63] Continuation of Ser. No. 39,521, Mar. 29, 1993, Pat. No. 5,464,886, which is a continuation of Ser. No. 600,543, Oct. 19, 1990, abandoned.

[51] Int. Cl.$^6$ .................................................. B32B 27/38
[52] U.S. Cl. ........................ 428/414; 427/410; 427/386; 427/421; 428/418; 523/429; 528/117
[58] Field of Search ................................ 428/414, 418; 427/386, 410, 421; 523/429; 528/117

[56] References Cited

U.S. PATENT DOCUMENTS

| | | | |
|---|---|---|---|
| 2,528,932 | 11/1950 | Wiles et al. | 106/287 |
| 3,998,763 | 12/1976 | Bohnel | 260/2 EC |
| 4,277,390 | 7/1981 | Kuliev et al. | 260/37 EP |
| 4,608,280 | 8/1986 | Robinson et al. | 427/230 |
| 4,621,212 | 11/1986 | Torossian et al. | 310/260 |
| 4,631,230 | 12/1986 | Torossian et al. | 428/412 |
| 4,692,499 | 9/1987 | Torossian et al. | 525/524 |
| 4,928,736 | 5/1990 | Muszynski | 138/178 |
| 5,426,169 | 6/1995 | Starner | 528/103 |

FOREIGN PATENT DOCUMENTS

| | | | |
|---|---|---|---|
| 0147843 | 11/1981 | Japan | 523/429 |

OTHER PUBLICATIONS

Pipeline Casing Insulators, Casing End Seals & Wall Penetration Seals, Section 100, Bulletin No. 14825 Dec. 1985, Maloney Pipeline Products Co., 5220 Cedar Crest, Houston, TX 77087.

Pipeline Protection Materials, Standard Rock Shield, Protective Padding, Rock Shield Tape #400 Pressure Sensitive, PP–79 4–18, Johns–Manville, Ken–Caryl Ranch, Denver, CO 80217.

Rock Jacket, Shaw Jacket Systems by Shaw Pipe Protection Limited, 25 Bethridge Road, Rexdale Ontario, Canada M9W 1M7.

Epon Resin 826, Technical Bulletin Shell Chemical Company, SC: 235–82.826, Shell Chemical Co., 3200 Southwest Fwy., Ste. 1230, Houston, TX 77027.

Araldite 508 Flexible Epoxy Resin, Ciba–Geigy Product Data, CR 474B4M14, Resins Department, Ciba–Geigy Corporation, Three Skyline Drive, Hawthorne, N.Y. 10532.

The Use of Aminoethylpiperazine in Curing Epoxy Resins, TSB–1122R 102–5418R, Texaco Chemical Co., Technical Services Section, P.O. Box 15730, Austin, TX 77227–7707.

*Primary Examiner*—Melvyn I. Marquis
*Assistant Examiner*—D. Aylward
*Attorney, Agent, or Firm*—Vinson & Elkins L.L.P.

[57] ABSTRACT

The improved coating of the present invention provides a protective coating for pipe, tubular shapes, other metal members, and metal structures. The protective coating comprises a polymer concrete, which is preferably a mixture of an organic resin, a filler material and a chemical activator. The organic resin is preferably a mixture of thermosetting polymer resins, such as bisphenol A based epoxy, bisphenol A based epoxy blended with polyglycol di-epoxide, and polyglycol di-epoxide. The filler material may be calcium carbonate, silica flour, zeosphere, talc, or kaolin, and preferably is of up to 200 mesh in size. The chemical activator preferably is an amine, such as aminoethylpiperazine or tetraethylene pentamine. The protective coating may be prepared by the process comprising the steps of combining and then heating the organic resin and filler material, mixing the organic resin and filler material with the chemical activator to create a polymer concrete, spraying the polymer concrete on the metal member or structure, and protecting the sprayed polymer concrete for a polymerization period.

8 Claims, 8 Drawing Sheets

POLYMER CONCRETE COATING FOR PIPE, TUBULAR SHAPES, OTHER METAL MEMBERS AND METAL STRUCTURES

This application is a continuation of U.S. Ser. No. 08/039,521 filed Mar. 29, 1993, U. S. Pat. No. 5,464,886 which a continuation of U.S. Ser. No. 07/600,543 filed Oct. 19, 1990, now abandoned.

FIELD OF THE INVENTION

The present invention relates to an improved polymer concrete coating for pipe, tubular shapes, other metal members, and metal structures to protect the member or structure and any subcoating, such as corrosion protection coatings.

BACKGROUND OF THE INVENTION

Often, to protect pipe, other metal members or metal structures, the outer surface of the object is coated. There are many coatings used for protection, including a variety of epoxies. For example, the outer surface of a steel pipe, when used in an outdoor application, is normally provided with a corrosion resistant coating, such as a fusion bonded epoxy coating. Federal law requires that underground pipelines be provided with a corrosion coating and that the corrosion coating be intact prior to installation. 49 C.F.R. §§192.451–192.491 (1989). Often there are manufacturing defects in pipe that prevent the corrosion coating from being continuous. These defects, called "slivers," are similar to splinters in wood or burrs in the pipe steel. The "slivers" are large enough that the fusion bonded epoxy corrosion coating does not cover them, resulting in "holidays" or holes in the coating. Moreover, often there are so many "slivers" and resulting "holidays" that the coating cannot be "patched" and the pipe cannot be installed. Efforts to develop a cost effective means for salvaging such pipe have not been successful. For example, it is not cost efficient to remove a fusion bonded epoxy coating, refinish the surface of the pipe to eliminate the "slivers," and then recoat the pipe. Even if the pipe is recoated, the "holidays" often reappear. Thus, there is a need for a cost efficient means to repair fusion bonded epoxy corrosion protection coatings riddled with "holidays" created by "slivers."

In addition to corrosion protection, when the pipe is buried in the ground the pipe is often further protected. For instance, at underground road crossings, the pipe is usually enclosed within a tubular metal casing and is supported within the casing by a mechanical device known as a pipeline casing insulator. In addition to supporting the pipe, the pipeline casing insulator prevents damage to the pipe and any pipe coating when the pipe is drawn through the casing during installation, and it electrically insulates the pipe from the casing.

A typical example of a metal pipeline casing insulator is illustrated in Pipeline Casing Insulators, Casing End Seals and Wall Penetration Seals, Section 100, Bulletin No. 14825 12/85, Maloney Pipeline Products Co. of 5200 Cedar Crest, Houston, Tex. 77087. The components of such a pipeline casing insulator, the band, the rubber liner, the runners and the mounting hardware, are provided as separate components that are relatively expensive and that require time consuming field assembly. Additionally, the metallic components of such a pipeline casing insulator can damage the integrity of the corrosion resistant coating during assembly. A pipeline casing insulator utilizing polymer concrete, as described in U.S. Pat. No. 4,928,736, however, requires no field assembly and is less expensive than typical metal pipeline casing insulators. Moreover, it contains no metal parts that could damage the pipe coating during attachment or later interfere with cathodic protection.

Although the polymer concrete pipeline insulator solved problems associated with traditional pipeline casing insulators, the utilization of casings at underground crossings is expensive and time consuming. Thus, it is desirable to install pipelines at underground road crossings without the use of casings. The method of installing pipelines at underground road crossings without casings is commonly referred to as the "slick bore" method. Alternatives for protecting the pipe coating during "slick bore" installation have been tried, but none of these prior alternatives are without problems.

One prior alternative for protecting pipe during "slick bore" installation is to coat the outer surface of the pipe, in addition to any corrosion coating, with portland cement concrete. The portland cement concrete coating is usually a minimum of 1½"–2" in thickness. The diameter of the pipe, therefore, is increased by a minimum of 3"–4". Thus, a larger diameter bore for the underground crossing is required for the portland cement coated pipe than for pipe not coated with portland cement concrete. The increase in the bore diameter increases the cost of installation. Additionally, because of the heavy coating of portland cement concrete, the weight of the pipe is greatly increased. The increase in weight increases the shipping costs of the pipe, if coated prior to shipment to the field, increases the difficulty of installation, and increases the risk of damage to the pipe structure during installation of the pipe. Moreover, the portland cement coating process, including application and setting or preliminary curing, typically requires several days to be completed. It is a time consuming alternative.

Another prior alternative for protecting pipe during "slick bore" installation is to increase the thickness of a corrosion coating, such as a fusion bonded epoxy coating. Even with the increase in thickness of the coating, however, the pipe corrosion coating is usually damaged during installation to the extent that "holidays" in the coating result. Thus, the integrity of the corrosion coating is not maintained.

As with installation at underground crossings, when pipe is buried in a rocky terrain, the pipe and any coating must be protected. Generally, the prior art rocky terrain protection systems are installed mechanically, such as with tape. One such rocky terrain protection system is described in Pipe Protection Materials, Standard Rock Shield, Protective Padding, Rock Shield Tape #400, Pressure Sensitive, PP-79 4–18, Johns-Manville, Ken-Caryl Ranch, Denver, Colo. 80217. Field installation of such prior art rocky terrain protection systems is time consuming and labor intensive. Not all rocky terrain protection systems are installed in the field. One such system is described in Rock Jacket, Shaw Jacket Systems by Shaw Pipe Protection Limited of 25 Bethridge Road, Rexdale, Ontario, Canada M9W 1M7. The Rock Jacket System includes a reinforced wire mesh coating and an outer tape wrap. The Rock Jacket system absorbs water so that it conducts electricity.

Just as is the case when pipe is installed at underground crossings, it is possible to protect pipe in rocky terrain by portland cement concrete coatings. As described above, however, portland cement concrete coatings increase the weight of the pipe and are time consuming to install.

One object of the present invention is to provide an improved coating that eliminates the need for casing and pipeline casing insulators for installation of pipe at underground crossings, without greatly increasing the weight of the pipe and without increasing the risk of damage to the pipe structure and any subcoating during installation.

Another object of the present invention is to provide an improved coating that protects pipelines and any subcoatings, such as fusion bonded epoxy, during installation of pipelines in rocky terrain. Moreover, it is an object of the present invention to provide an improved coating that so protects the pipelines and any subcoatings without time consuming field installation.

Another object of the present invention is to provide an improved coating that salvages fusion bonded epoxy coated pipe in which "holidays" are formed in the fusion bonded epoxy coating by "slivers" in the pipe.

Still another object of the present invention is to provide an improved coating that protects pipe, other metal members and metal structures from abrasion and corrosion without the need of a corrosion protection subcoating.

A further object of the present invention is to provide an improved coating that insulates pipe, other metal members and metal structures from electrical charges.

Additionally, it is an object of the present invention to provide an improved coating that protects pipe, other metal members, metal structures and any subcoatings in high temperature environments.

SUMMARY OF THE INVENTION

In its preferred embodiment, the present invention relates to an improved polymer concrete coating for pipe, tubular shapes, other metal members, and metal structures comprising a mixture of an organic resin that acts as a cementing agent, a filler material, and a chemical activator, which is applied to the outer surface of the metal member in a suitable thickness. The improved coating of the present invention may be prepared by the process of combining and then heating the organic resin and filler material, mixing the combined organic resin and filler material with the chemical activator to create the polymer concrete, spraying the polymer concrete on the item to be coated, and protecting the polymer concrete coating for a polymerization period.

DESCRIPTION OF THE DRAWINGS

These and other objects and advantages of the present invention are hereinafter set forth and explained with respect to the drawings wherein.

DESCRIPTION OF THE PREFERRED EMBODIMENTS

Figure 1:
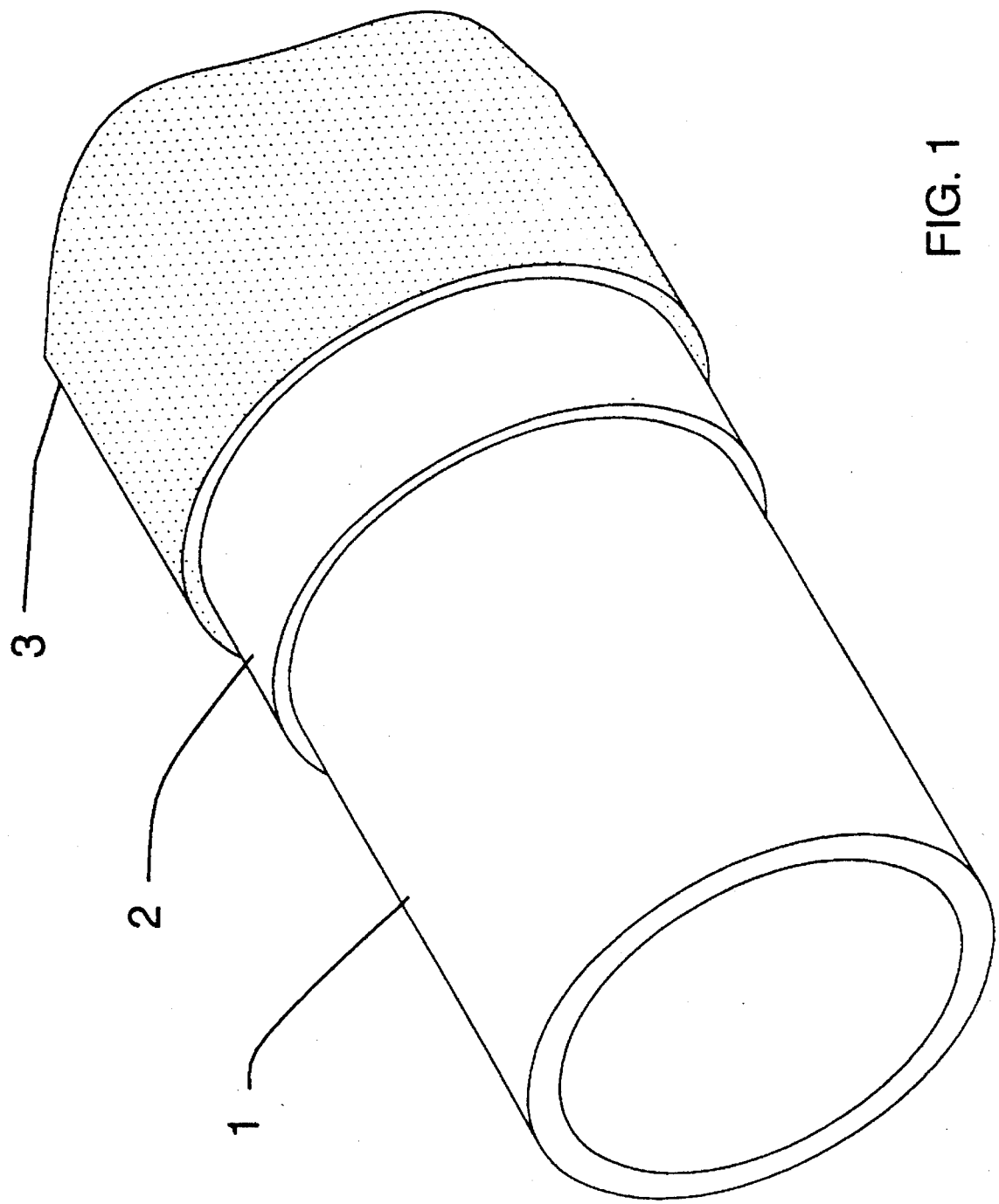
FIG. 1 is an isometric view of a pipe showing a corrosion protection coating thereon and the improved coating of the present invention overlaying the corrosion protection coating.

The present invention is an improved electrically non-conductive, insulative, water resistant polymer concrete coating applied to pipe, tubular shapes, other metal members and metal structures. A preferred form of the present invention is illustrated in FIG. 1. As shown in FIG. 1, the exterior surface of a pipe 1 has a corrosion protection coating 2 thereon, such as a fusion bonded epoxy coating, and a coating of the improved polymer concrete of the present invention 3 on top of the corrosion protection coating. The polymer concrete utilized in the improved coating 2 of the present invention, described in more detail below, has been utilized in manufacturing the polymer concrete pipeline casing insulators described in U.S. Pat. No. 4,928,736, more than one year before the filing date of this application.

The improved polymer concrete coating of the present invention comprises a mixture of an organic resin that acts as a cementing agent, a filler material and a chemical activator. The organic resin is preferably a thermosetting polymer, such as an epoxy. Preferably, the organic resin is a mixture of a bisphenol A based epoxy and a polyglycol di-epoxide. A mixture composed of 40–60% by weight of a bisphenol A based epoxy, for example, 50% by weight of EPON® Resin 826 described in Technical Bulletin Shell Chemical Company, SC:235–82.826, Shell Chemical Company, 3200 Southwest Freeway, Suite 1230, Houston, Tex. 77027, and 40–60% by weight of a bisphenol A based epoxy blended with a polyglycol diepoxide, for example, 50% by weight Araldite® 508 Flexible Liquid Epoxy Resin described in CIBA-GEIGY Product Data, CR 474B4M14, Resins Department, CIBA-GEIGY Corporation, Three Skyline Drive, Hawthorne, N.Y. 10532, is known to work. It is believed that an alternative organic resin mixture is 60–75% by weight of a bisphenol A based epoxy and 25–40% by weight of a polyglycol di-epoxide.

The chemical activator is preferably an amine, such as a polyamine or polyamide. Aminoethylpiperazine is a chemical activator known to work. It is believed that an alternative chemical activator is tetraethylene pentamine.

The filler material is necessary to add bulk to the coating and decrease the cost of the coating. Additionally, the filler material should improve the physical properties of the improved polymer concrete coating of the present invention. For example, it should absorb the exotherm connected with the chemical reaction of the organic resin with the chemical activator, thereby decreasing the possibility of cracking in the coating. It should also decrease the chance of shrinkage and increase the compressive and flexural strengths of the polymer concrete coating of the present invention. Finally, the filler material should be a size that allows the improved polymer concrete coating to be sprayed. For example, filler material of up to 200 mesh which is approximately 127 microns in size is known to work. There are many filler materials that will satisfy these requirements. It is believed that acceptable filler materials include calcium carbonate, silica flour, zeospheres talc and kaolin. It is known that calcium carbonate up to 200 mesh in size is an acceptable filler material.

The ratio, by weight, of the filler material to the organic resin described above is preferably between about 1:1 and 7:3. The ratio, by volume, of the chemical activator to the combination of organic resin described above and filler material is preferably between about 1:8.75 and 1:10.75. These ratios allow the improved polymer concrete of the present invention to be sprayed, while maintaining the improved characteristics of the polymer concrete coating of the present invention, including its strong bond to fusion bonded epoxy, durability, electrical non-conductivity, insulative quality, and water resistance.

As shown in FIG. 1, the improved coating of the present invention may be applied to metal members or structures that have been previously treated with a corrosion coating, such as fusion bonded epoxy. The fusion bonded epoxy coating should be clean and dry prior to applying the improved polymer concrete coating of the present invention. The improved polymer concrete coating bonds extremely well to fusion bonded epoxy. The bond is such that a failure in the bond does not occur between the improved polymer concrete coating and the fusion bonded epoxy. When applied in a suitable thickness, for example, from about 10 mils to ½", the improved polymer concrete coating is durable. Thus, the pipe or other metal member and the corrosion coating are protected during potentially damaging and difficult installations. Moreover, because of its excellent bond to fusion bonded epoxy and its durability, it is believed that the improved coating of the present invention will not disbond from fusion bonded epoxy over time and will continue to protect the pipe or other metal member after installation.

More particularly, the improved coatings of the present invention protects pipe during "slick bore" installation at underground crossings, without greatly increasing the weight of the pipe and without increasing the risk of damage to the pipe structure and any subcoating during installation. The improved coating of the present invention may be applied to the pipe at the same location that any corrosion protection is applied. Thus, there is no additional transportation required to apply the improved coating of the present invention.

Additionally, the improved coating of the present inventions solves many of the problems associated with portland cement coated pipe. A thickness of ⅛" of the improved polymer concrete coating can be applied to a 40 ft.–42" diameter pipe in one hour or less and the improved polymer concrete coating sets within 24 hrs. Thus, the coating process takes significantly less time than that required to coat pipe or other metal members with portland cement concrete. Because only a thin coat of the improved polymer concrete is required, the increase in weight of the pipe due to the improved polymer concrete coating is minimal. For example, for a 42" diameter steel pipe, the improved polymer concrete coating need only be a maximum of approximately ⅛" thick, resulting in an increase in the weight of a 40 ft.–42" diameter steel pipe of only approximately 500 lbs. A 1–½"–2" coating of portland cement concrete, on the other hand, increases the weight of a 40 ft.–42" diameter steel pipe by approximately 11,500 lbs. A typical 40 ft.–42" diameter steel pipe weighs approximately 8,500 lbs. Thus, as compared with prior art portland cement concrete coatings, the pipe weight is much less, resulting in lower transportation costs and easier installation at underground crossings.

Moreover, as compared with portland cement coated pipe, pipe coated with the improved polymer concrete coating of the present invention is easier to install at underground crossings, because of its relative lightness and smoother finish. The smoother finish results in a lower coefficient of friction, which combined with the relative lightness of pipe coated with the improved polymer concrete of the present invention makes it easier to install. In short, because of the minimal increase in weight, the relatively smooth finish as compared with portland cement concrete coatings, the durability of the improved coating of the present invention, and the extremely strong bond of the improved coating of the present invention to fusion bonded epoxy, risk of damage to the pipe structure and any subcoating, such as fusion bonded epoxy, is minimal.

Similarly, the improved coating of the present invention protects pipelines and any subcoatings during installation in rocky terrain. Because it bonds extremely well to fusion bonded epoxy, a common subcoating it is believed that the improved coating of the present invention will not disbond during installation or use in rocky terrain. The improved coating of the present invention is typically not installed in the field, thereby eliminating the time and expense of labor in the field. Finally, because of the hard, protective coating supplied by the improved coating of the present invention, the pipe and any subcoating is effectively protected during and after installation in rocky terrain.

Figure 3:
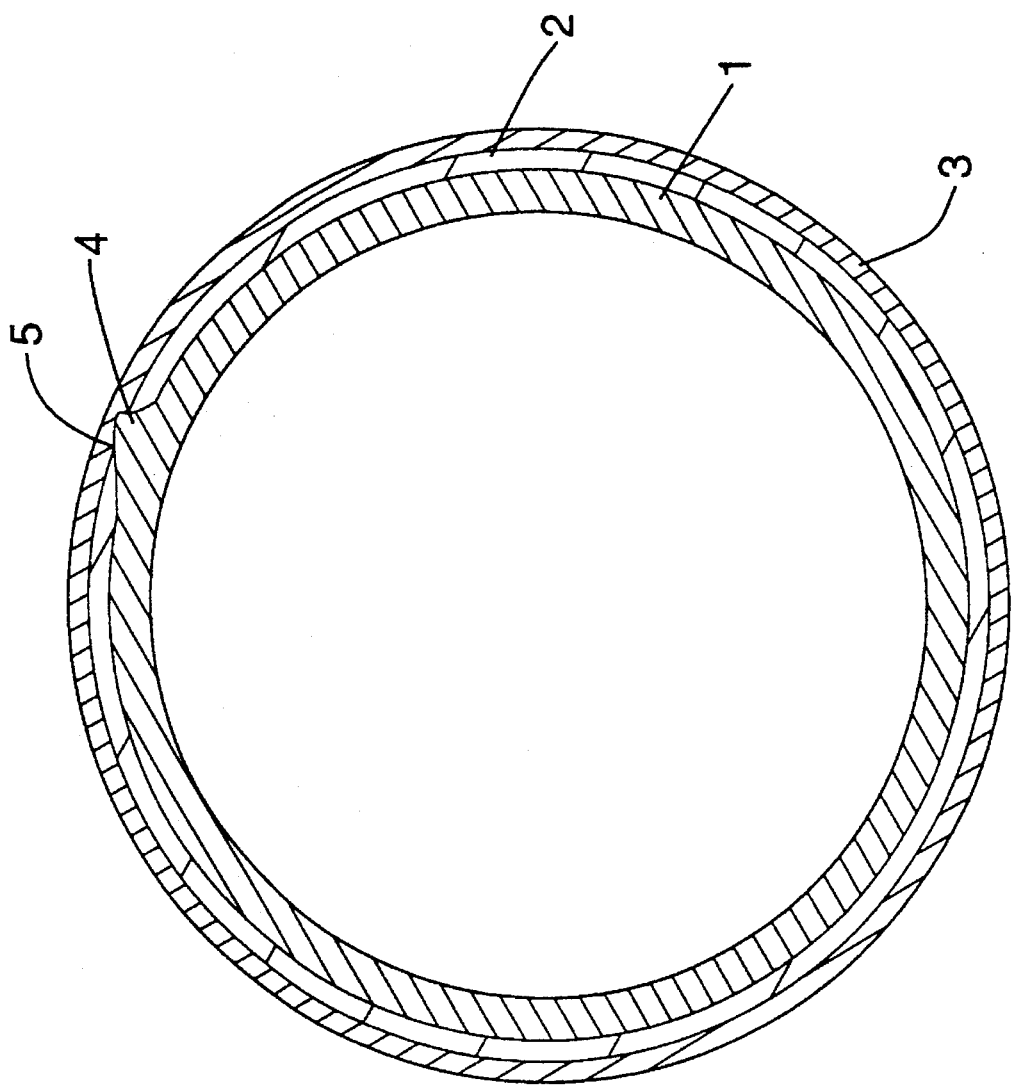
FIG. 3 is a cross-sectional view of a pipe showing a corrosion protection coating thereon, a "holiday" formed in the corrosion protection coating by a "sliver," and the repair of the "holiday" provided by the improved coating of the present invention.
Figure 3A:
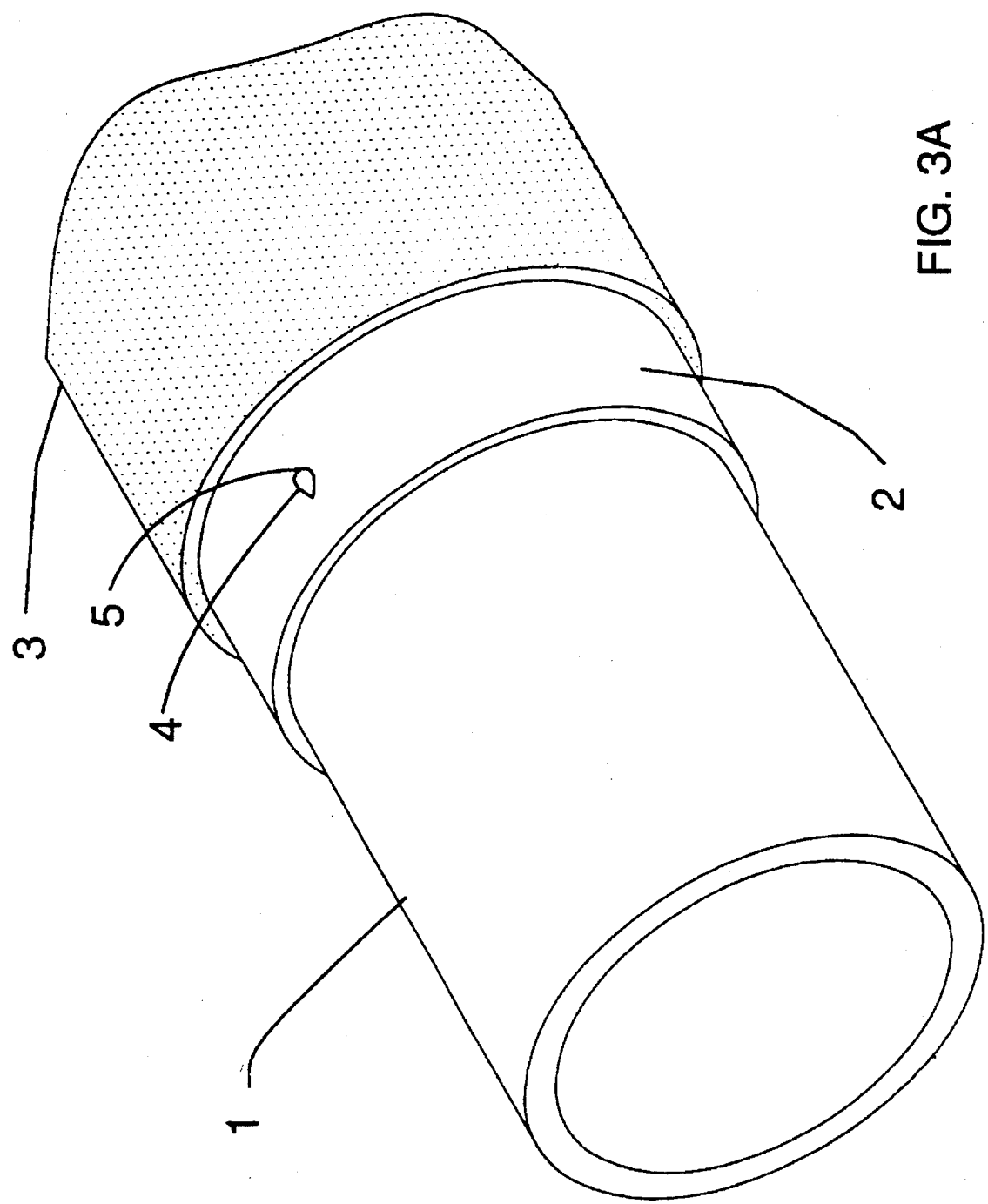
FIG. 3a is an isometric view of a pipe showing a corrosion protection coating thereon, a "holiday" formed in the corrosion protection coating by a "sliver," and the improved coating of the present invention overlaying the corrosion protection coating.

Additionally, as shown in FIGS. 3 and 3a, because of its excellent bond to fusion bonded epoxy coatings, the improved coating of the present invention 3 may be used to salvage fusion bonded epoxy coated pipe in which the fusion bonded epoxy coating is riddled with "holidays" created by "slivers," by applying the improved coating of the present invention over the fusion bonded epoxy coating. As shown in FIGS. 3 and 3a, the exterior surface of a pipe 1 has a corrosion protection coating 2 thereon, such as a fusion bonded epoxy coating, and a coating of the improved polymer concrete of the present invention 3 on top of the corrosion protection coating. Additionally, there is a "sliver" 4 in the pipe 1 creating a "holiday" 5 in the corrosion protection coating 2. As shown in FIG. 3, the improved coating of the present invention 3 covers the "sliver" 4 and repairs the "holiday" 5. Because of the extremely strong bond between the improved coating of the present invention and fusion bonded epoxy, the improved coating of the present invention 3 eliminates the "holidays" and, therefore, salvages the pipe for installation.

Additionally, because the improved coating of the present invention 3 is electrically non-conductive, it is believed that, when applied in a suitable thickness, it may be used to insulate metal members or structures from electrical charges.

Furthermore, because the improved coating of the present invention 3 is water resistant and withstands high temperatures, it is believed that, when applied in a suitable thickness, it may be used to protect pipe, other metal members, metal structures, and any fusion bonded epoxy subcoatings in high temperature environments.

Figure 2:
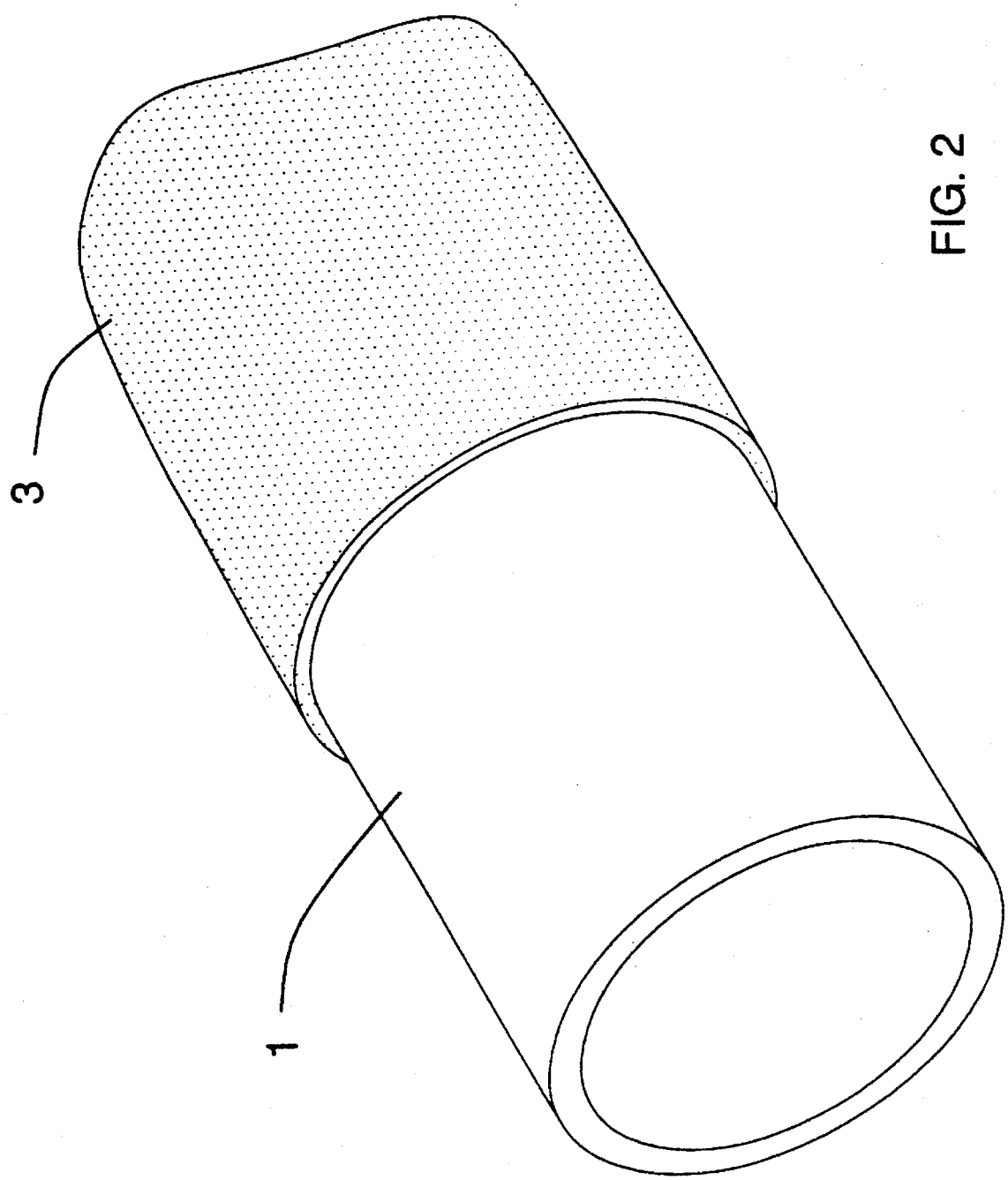
FIG. 2 is an isometric view of a pipe showing the improved coating of the present invention thereon, without any subcoatings.

An alternative preferred embodiment of the improved polymer concrete coating of the present invention is shown in FIG. 2. With reference to FIG. 2, the improved coating of the present invention may be applied to metal members or structures that have not been previously treated with a corrosion coating. As shown in FIG. 2, the exterior surface of a pipe 1 has a coating of the improved polymer concrete of the present invention 3 thereon. There is no subcoating in FIG. 2. It is believed that the improved coating of the present invention 3 by itself, when applied in a suitable thickness, will provide corrosion protection, as well as protect the member during installation. Additionally, it is believed that the other characteristics of the improved polymer concrete coating of the present invention 3 described with respect to FIG. 1, such as its durability, electrical non-conductivity, insulative quality, and water resistance, will be maintained when applied by itself in a suitable thickness.

Figure 4:
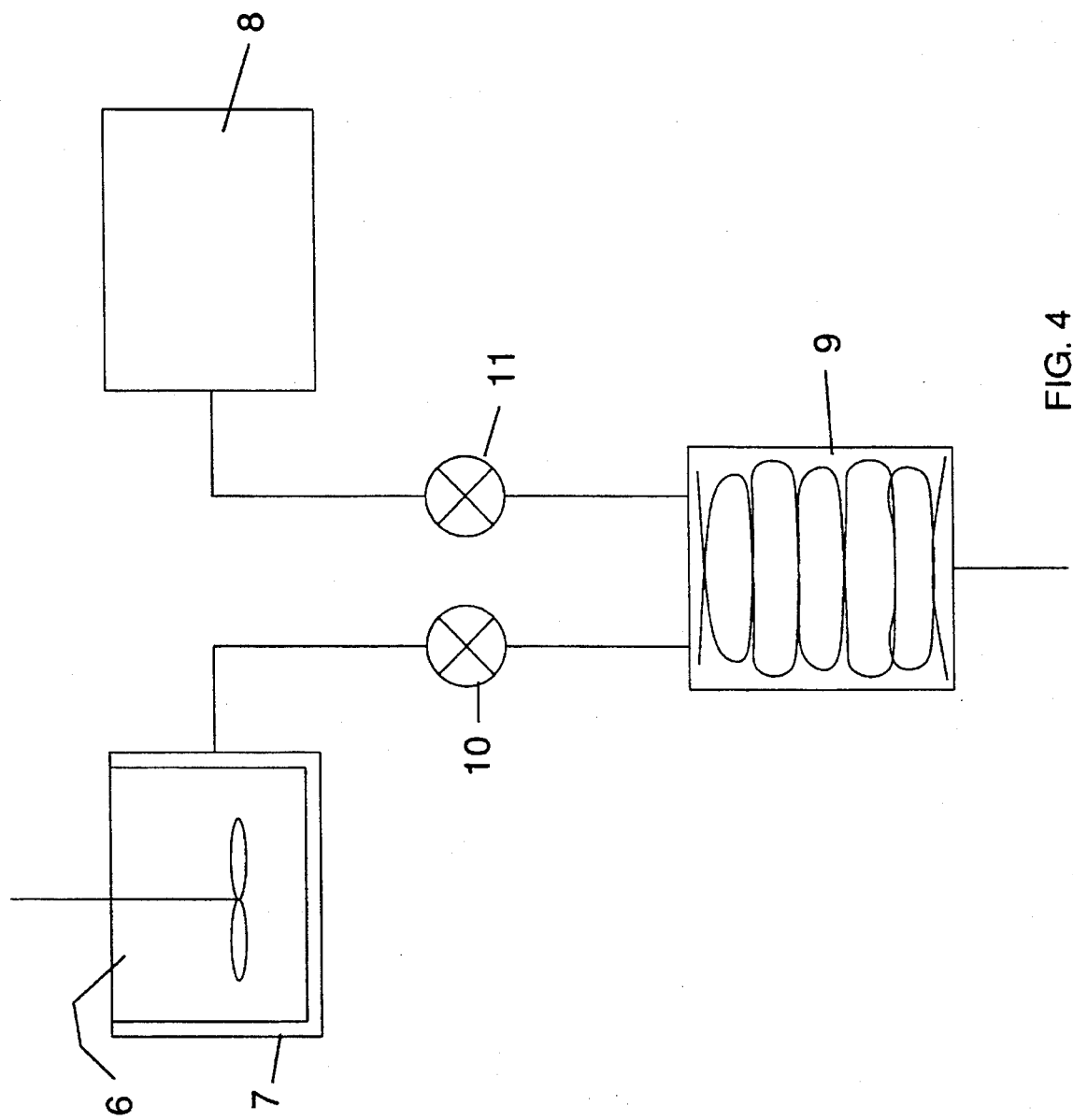
FIG. 4 is a schematic showing the heating of the combination of the organic resin and the filler material and the mixing of the combination of the organic resin and filler material with the chemical activator.
Figure 4A:
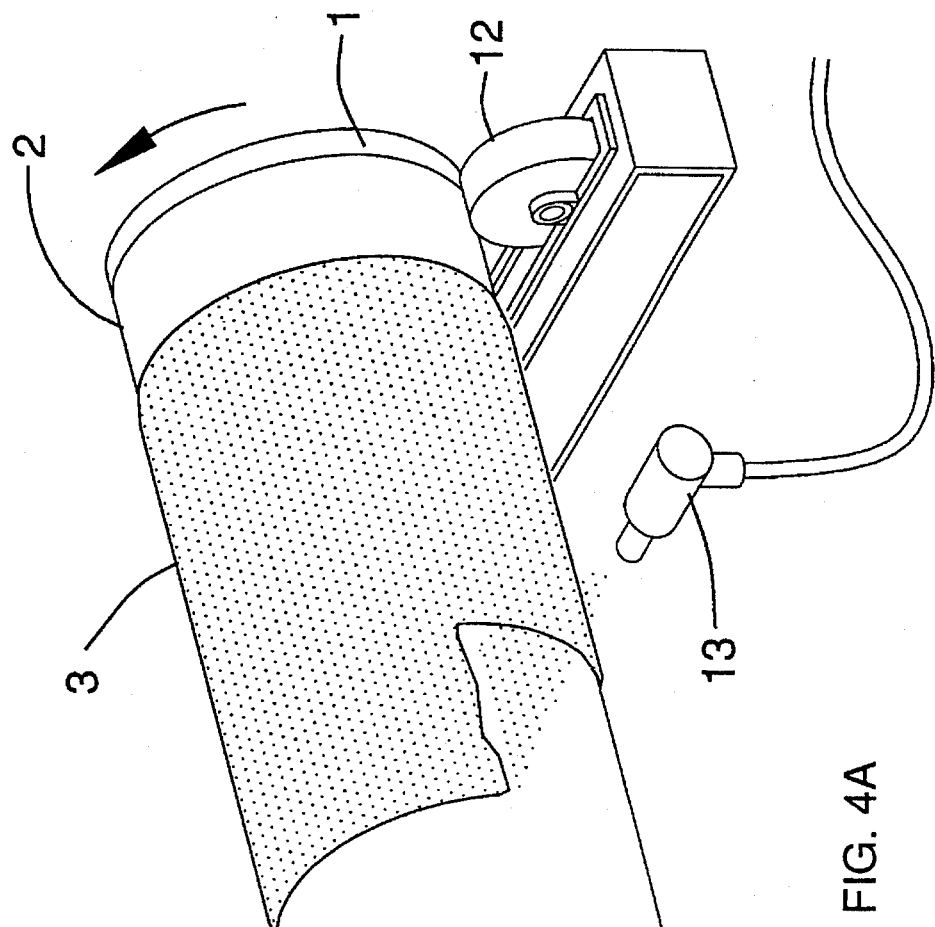
FIG. 4a is an isometric view showing the spraying of the improved coating of the present invention on the pipe shown in FIG. 1.
Figure 4B:
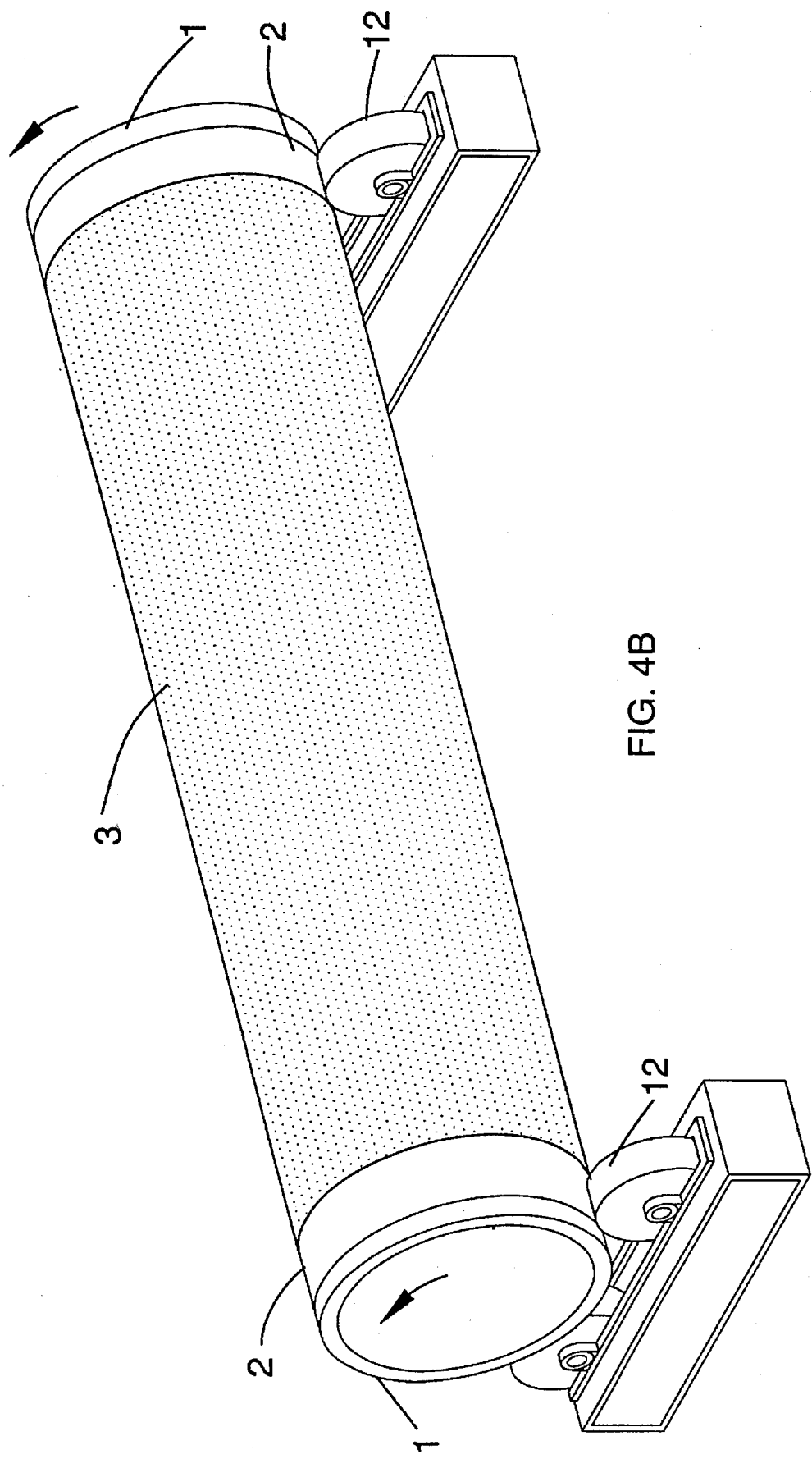
FIG. 4b is an isometric view showing the pipe shown in FIG. 1 turning after being sprayed with the improved coating of the present invention.
Figure 4C:
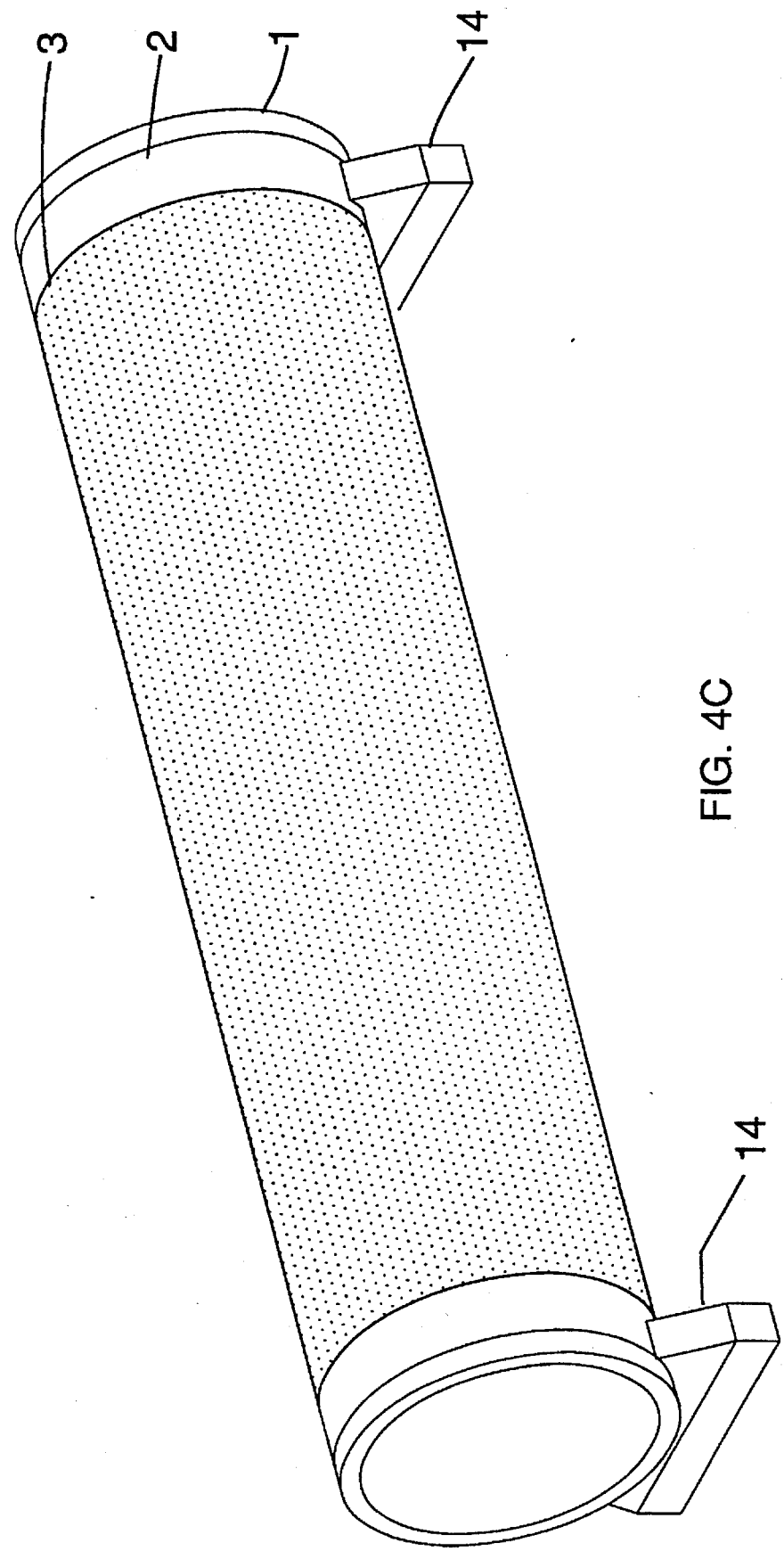
FIG. 4c is an isometric view showing the pipe shown in FIGS. 1 and 4b being protected for a polymerization period after being sprayed with the improved concrete of the present invention.

As shown in FIGS. 4 through 4c, the improved coating of the present invention may be prepared by the process comprising the steps of combining and then heating the combination of organic resin and filler material, mixing the combination of organic resin and filler material with the chemical activator to create the polymer concrete, spraying the polymer concrete on the metal member or structure, and protecting the polymer concrete coating for a polymerization period. The metal member or structure so coated may or may not be previously coated with a corrosion protection coating, such as fusion bonded epoxy. As shown in FIG. 4, the combination of organic resin and filler material 6 is heated by a heating means 7. The combination of the organic resin and filler material 6 and the chemical activator 8 are pumped by pumping means 10 and 11 to a mixer 9 where they are mixed together, resulting in the polymer concrete of the improved coating of the present invention 3. The mixture of the resin and filler material is heated to a temperature of preferably about 120° F. to 180° F. During cold weather, the chemical activator is heated to a temperature of preferably about 70° F. to 120° F.

To aid in spraying the improved polymer concrete, the metal member may be turned during the spraying process. For example, with reference to FIG. 4a, a pipe 1 is supported and turned by roller means 12 while the improved coating of the present invention 3 is sprayed on the pipe 1 by sprayer means 13. Additionally, as shown in FIG. 4a, the improved polymer concrete coating 3 is preferably applied to all of the exterior of the pipe 1 except a distance of between about 6" and 12" from the ends of the pipe 1. Thus, the ends of the pipe 1 are free of the coating and may be welded together when installed. Thereafter, the improved polymer concrete coating 3 may be applied at the installation site to the pipe joint and uncoated ends of the pipes. The pipe 1 may be coated with the improved polymer concrete in situ by the process comprising the steps of wrapping a collar or form around the welded joint and uncoated ends of the pipes, pouring the polymer concrete into the form or collar, allowing the concrete to polymerize, and removing the form or collar.

After the improved polymer concrete coating of the present invention 3 is applied, the coated item may continue to be turned for an initial polymerization period. As shown in FIG. 4b, a pipe 1 coated with the improved coating of the present invention is supported and turned by roller means 12, during an initial polymerization period of the improved coating of the present invention 3. For example, after an improved polymer concrete coating of approximately 1/8" has been applied to a 42" diameter steel pipe, in temperatures above 70° F., the pipe is turned for an additional time period of about 30 minutes. Thereafter, the pipe or other metal member is stored so that the improved coating is protected for the remainder of the polymerization period. For example, as shown in FIG. 4c, a pipe 1 coated with the improved coating of the present invention 3 is supported and protected by support means 14 while the improved coating of the present invention 3 is allowed to polymerize. The pipe may be stored outside during warm weather on supports to protect the coating from the ground.

What is claimed is:

1. A protective coating for metal members prepared by a process comprising the steps of:

heating a combination of a filler material and an organic resin, wherein the organic resin comprises about 60–75% by weight of a bisphenol A based epoxy and between about 25–40% by weight of a polyglycol diepoxide;

mixing the combination of the organic resin and the filler material, wherein the ration by weight of said filler material to said organic resin is between about 1:1 and 7:3 with an amine, selected from a group consisting of aminoethylpiperazine and tetraethylenepentatmine, to create a polymer concrete;

spraying the polymer concrete on a metal member; and protecting the sprayed polymer concrete from contact with other surfaces until it has polymerized.

2. A protective coating for metal members prepared by the process as defined in claim 1, wherein the combination of the organic resin and the filler is heated to a temperature between 120° F. and 180° F.

3. A protective coating for metal members prepared by the process as defined in claim 1, wherein the amine is heated to a temperature of between about 70° F. and 120° F.

4. A protective coating for metal members prepared by the process as defined in claim 1, wherein the metal member is turned while said polymer concrete is sprayed on the metal member.

5. A protective coating for metal members prepared by the process as defined in claim 1, wherein the ratio by weight of the organic resin and filler material to the amine is between about 1:0.05 and 1:10.12.

6. A protective coating for metal members prepared by the process as recited in claim 1, wherein organic resin comprises: between about 40–60% of a bisphenol A based epoxy, and; between about 40–60% of a bisphenol A based epoxy blended with a polyglycol di-epoxide.

7. A protective coating for metal members prepared by a process as recited in claim 1, wherein the organic resin comprises: between about 60–75% of a bisphenol A based epoxy, and; between about 25–40% of a polyglycol di-epoxide.

8. A protective coating for metal members prepared by the process as defined in claim 1, wherein the metal member has a coating of fusion bonded epoxy, and the polymer concrete is sprayed on top of the coating of fusion bonded epoxy.

\* \* \* \* \*